(12) United States Patent
Furukawa et al.

(10) Patent No.: US 10,421,196 B2
(45) Date of Patent: Sep. 24, 2019

(54) TRANSFER APPARATUS

(71) Applicant: DAIHEN Corporation, Osaka-shi, Osaka (JP)

(72) Inventors: Junichi Furukawa, Osaka (JP); Hiroki Watanabe, Osaka (JP)

(73) Assignee: DAIHEN Corporation, Osaka-Shi, Osaka (JP)

( * ) Notice: Subject to any disclaimer, the term of this patent is extended or adjusted under 35 U.S.C. 154(b) by 0 days.

(21) Appl. No.: 16/044,368

(22) Filed: Jul. 24, 2018

(65) Prior Publication Data

US 2019/0030726 A1 Jan. 31, 2019

Related U.S. Application Data

(60) Provisional application No. 62/537,180, filed on Jul. 26, 2017.

(51) Int. Cl.
*B25J 15/00* (2006.01)
*B25J 9/04* (2006.01)
*B25J 9/10* (2006.01)

(52) U.S. Cl.
CPC .......... *B25J 15/0052* (2013.01); *B25J 9/042* (2013.01); *B25J 9/104* (2013.01)

(58) Field of Classification Search
CPC ............... B25J 11/0095; B25J 15/0009; B25J 15/0014; B25J 15/0019; B25J 15/0052; B25J 9/042; B25J 9/104; H01L 21/67742; H01L 21/683; H01L 21/68707; Y10S 414/141; Y10S 901/30; Y10S 901/39
See application file for complete search history.

(56) References Cited

U.S. PATENT DOCUMENTS

| | | | | |
|---|---|---|---|---|
| 9,202,733 | B2 * | 12/2015 | Hosek | H01L 21/677 |
| 2001/0036398 | A1 * | 11/2001 | Hofmeister | B25J 9/042 |
| | | | | 414/744.1 |
| 2002/0066330 | A1 * | 6/2002 | Namba | B25J 9/042 |
| | | | | 74/490.01 |
| 2006/0099063 | A1 * | 5/2006 | Pietrantonio | B25J 9/042 |
| | | | | 414/744.5 |
| 2009/0087288 | A1 * | 4/2009 | Hofmeister | B25J 9/106 |
| | | | | 414/222.02 |

FOREIGN PATENT DOCUMENTS

JP 2008-135630 A 6/2008

* cited by examiner

*Primary Examiner* — Stephen A Vu
(74) *Attorney, Agent, or Firm* — Bret E. Field; Bozicevic, Field & Francis LLP

(57) ABSTRACT

An example transfer apparatus comprises: a first arm, a second arm rotatably connected to the first arm, a plurality of hands rotatably connected to the second arm in order to hold objects, a hand position transmission mechanism serving as a transmission mechanism for determining the rotation center position of the plurality of hands, a hand rotation transmission mechanism serving as a transmission mechanism for rotating the plurality of hands around the rotation axes of the respective hands in different directions, a single hand position motor serving as a motor for providing power for the hand position transmission mechanism, and a single hand rotation motor serving as a motor for providing power for the hand rotation transmission mechanism.

3 Claims, 10 Drawing Sheets

TRANSFER APPARATUS

CROSS-REFERENCE TO RELATED APPLICATIONS

This non-provisional application claims priority under 35 U.S.C. § 119(e) on provisional application for patent No. 62/537,180 filed on Jul. 26, 2017, the entire contents of which are hereby incorporated by reference.

FIELD

The present technology relates to a transfer apparatus for transferring, for example, substrates.

BACKGROUND AND SUMMARY

Conventionally, scalar-type transfer apparatuses have been proposed. A scalar-type transfer apparatus is equipped with, for example, a first arm, a second arm connected to the tip end section of the first arm, and two hands connected to the tip end section of the second arm. The first arm, the second arm and the two hands are each provided with a motor, whereby the first arm, the second arm and the two hands are driven independently from one another.

In such a scalar-type transfer apparatus, since the two hands are each required to be provided with a motor and are each required to be provided with a shaft for transmitting the rotation of the motor, the transfer apparatus is increased in size. Moreover, since the plurality of motors is required to be controlled synchronously, the control of the transfer apparatus becomes complicated.

The present disclosure is made in consideration of the above-mentioned circumstances, and an object thereof is to provide a transfer apparatus capable of being suppressed from becoming increased in size and complicated in control.

According to an aspect of the present disclosure, there is provided a transfer apparatus comprises: a first arm, a second arm rotatably connected to the first arm, a plurality of hands rotatably connected to the second arm in order to hold objects, a hand position transmission mechanism serving as a transmission mechanism for determining the rotation center position of the plurality of hands, a hand rotation transmission mechanism serving as a transmission mechanism for rotating the plurality of hands around the rotation axes of the respective hands in different directions, a single hand position motor serving as a motor for providing power for the hand position transmission mechanism, and a single hand rotation motor serving as a motor for providing power for the hand rotation transmission mechanism.

With this disclosure, the plurality of hands is driven using the single hand motor. Hence, the number of motors is reduced in comparison with the case in which a plurality of hands is driven using a plurality of motors. Furthermore, since the plurality of hands is controlled using the single hand rotation motor, the control is made easy in comparison with the case in which the plurality of hands is driven using the plurality of motors.

According to another aspect of the present disclosure, there is provided the transfer apparatus, wherein the plurality of hands has a first hand and a second hand that are arranged in the axial direction of a predetermined axis and rotatable around the axis, and the hand rotation transmission mechanism has: a first pulley rotated by the rotation of the hand rotation motor, an intermediate pulley for relaying the rotation of the first pulley, and a second pulley for transmitting rotation to the second hand, wherein a direction of the rotation transmitted to the second hand is opposite to that of the intermediate pulley, and the intermediate pulley rotates in the same direction as that of the first hand.

With this disclosure, the first hand and the second hand can be made to rotate in the directions opposite to each other by using the first pulley, the intermediate pulley and the second pulley. Hence, since the first hand and the second hand are merely made to rotate in the directions opposite to each other, the control is made easy.

According to another aspect of the present disclosure, there is provided the transfer apparatus, wherein the hand position transmission mechanism comprises: a third pulley disposed in the first arm and rotated by the rotation of the hand rotation motor and a fourth pulley connected to the third pulley via a belt and rotated in the same direction as that of the third pulley, and a fifth pulley disposed in the second arm and coaxially connected to the fourth pulley via a rotation shaft and a sixth pulley connected to the fifth pulley via a belt and rotated in the direction opposite to the rotation direction of the fifth pulley, wherein the sixth pulley is connected to the first pulley, the ratio of the diameter or the number of the teeth of the third pulley to that of the fourth pulley is 4:1, and the ratio of the diameter or the number of the teeth of the fifth pulley to that of the sixth pulley is 1:2.

With this disclosure, since the pulleys have the above-mentioned ratios between the diameters or the numbers of the teeth of the pulleys, the hand rotation motor may merely be driven only when the plurality of hands is rotated in different directions around the rotation axes of the respective hands. Hence, the control is made easier.

Since the plurality of hands can be driven using the single motor, the number of motors can be reduced, and the transfer apparatus can be suppressed from becoming increased in size and complicated in control.

The above and further objects and features will more fully be apparent from the following detailed description with accompanying drawings.

DETAILED DESCRIPTION OF NON-LIMITING EMBODIMENTS

Embodiment 1

Figure 1:
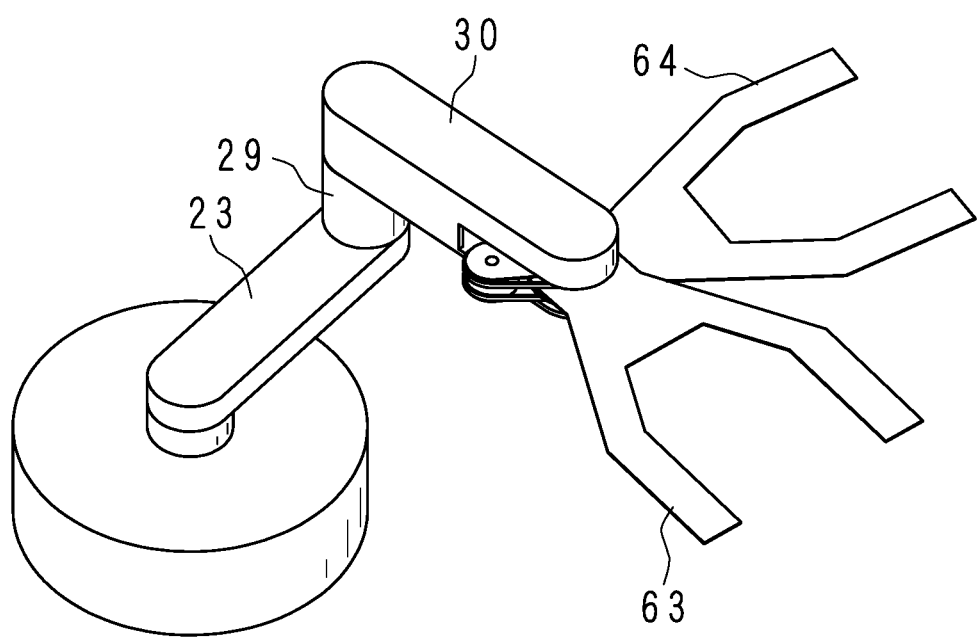
FIG. 1 is a perspective view schematically showing a transfer apparatus according to Embodiment 1.
Figure 2:
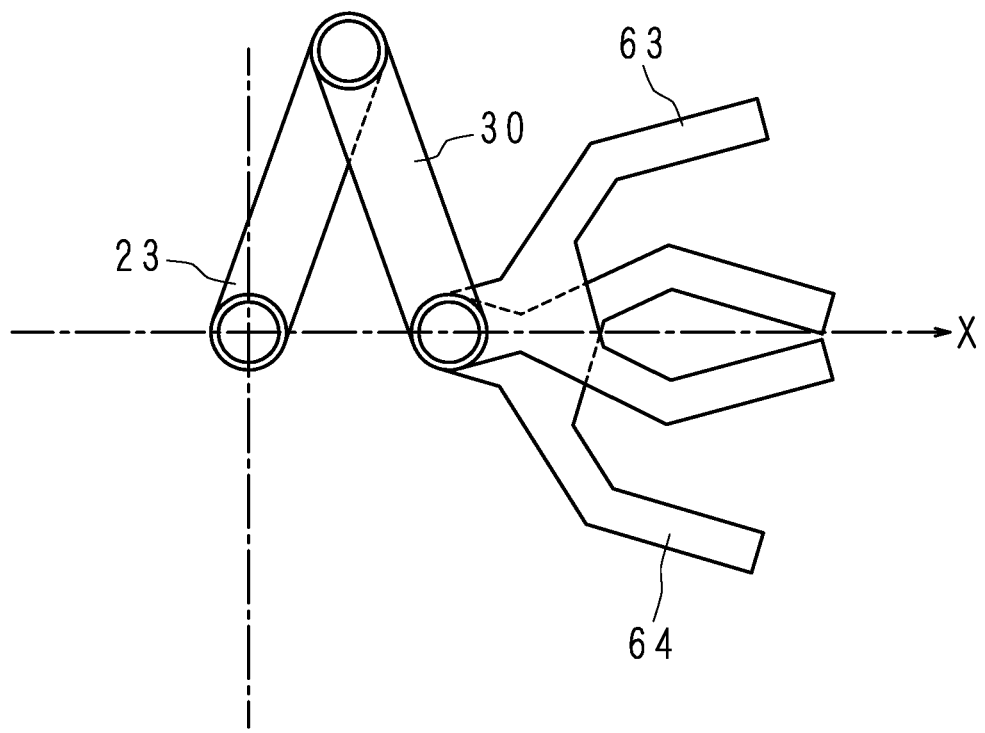
FIG. 2 is a schematic plan view showing the lower arm, the upper arm, the lower hand, and the upper hand of the transfer apparatus.

The present invention will be described below on the basis of the drawings showing a transfer apparatus 1 according to Embodiment 1. FIG. 1 is a perspective view schematically showing the transfer apparatus 1, FIG. 2 is a schematic plan view showing the lower arm 23, the upper arm 30, the lower hand 64, and the upper hand 63 of the transfer apparatus 1, and FIG. 3 is a vertical sectional view schematically showing the transfer apparatus 1.

Figure 3:
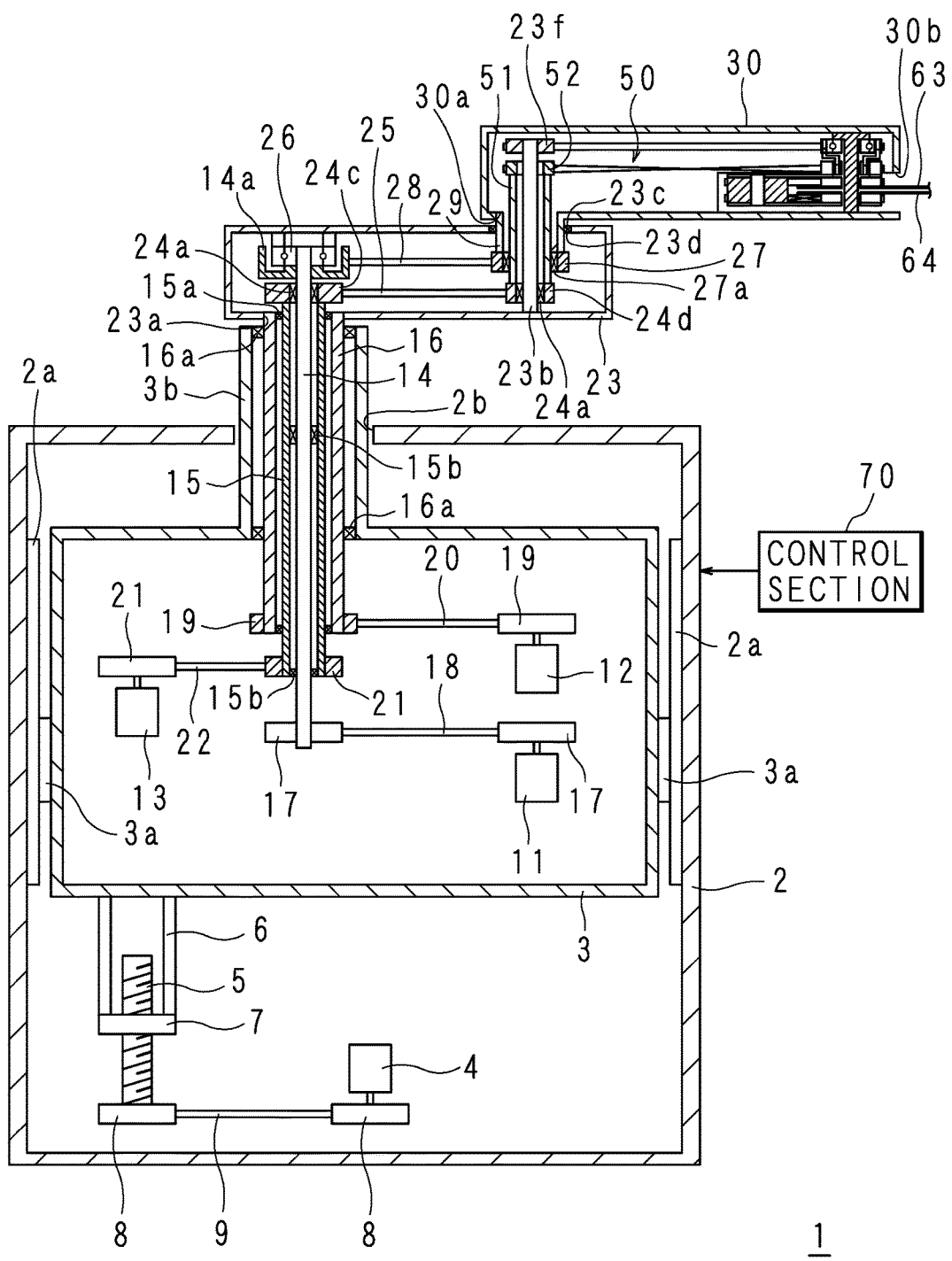
FIG. 3 is a vertical sectional view schematically showing the transfer apparatus.

As shown in FIG. 3, the transfer apparatus 1 is equipped with a housing 2 and rails 2a installed on the housing 2. The rails 2a are provided on both the side faces of the housing 2 and extend vertically. A through hole 2b is provided in the upper face of the housing 2.

A case 3 is provided inside the housing 2. Sliders 3a are provided on both the side faces of the case 3. Each slider 3a can slide vertically along each rail 2a. A cylindrical protruding section 3b protruding upward is provided on the upper face section of the case 3. The protruding section 3b is inserted into the through hole 2b so as to be movable vertically.

A screw shaft 5 is provided below the case 3, and a nut 7 is screw-engaged with the screw shaft 5. The nut 7 is provided with a cylindrical body 6. The screw shaft 5 and the cylindrical body 6 are disposed coaxially, and the axial direction thereof is aligned with the vertical direction. The upper end section of the cylindrical body 6 is connected to the lower face of the case 3.

A lifting motor 4 is provided below the case 3. The lifting motor 4 has a reduction gear (not shown) and rotates its output shaft via the reduction gear. The output shaft of the lifting motor 4 and the lower end section of the screw shaft 5 are respectively provided with pulleys 8, and the respective pulleys 8 are connected to each other via a belt 9. Hence, when the lifting motor 4 is driven, the output shaft of the lifting motor 4 is rotated, the screw shaft 5 is rotated, the nut 7 and the cylindrical body 6 are lifted or lowered, and the case 3 and the protruding section 3b are lifted or lowered.

First to third motors 11 to 13, a turning shaft 14, a hand shaft 15 and a lower arm shaft 16 are accommodated in the case 3. Each of the first to third motors 11 to 13 is provided with a reduction gear (not shown) and rotates its output shaft via the reduction gear. The lower arm shaft 16 has a cylindrical shape and is inserted into the inside of the protruding section 3b so as to be rotatable around its axis. The hand shaft 15 has a cylindrical shape and is inserted into the inside of the lower arm shaft 16 so as to be rotatable around its axis via bearings 15a. The turning shaft 14 is inserted into the inside of the hand shaft 15 so as to be rotatable around its axis via bearings 15b. The lower arm shaft 16 is inserted into the inside of the protruding section 3b so as to be rotatable around its axis via bearings 16a.

The output shaft of the first motor 11 is connected to the turning shaft 14 via pulleys 17, 17 and a belt 18. The output shaft of the second motor 12 (hand position motor) is connected to the lower arm shaft 16 via pulleys 19, 19 and a belt 20. The output shaft of the third motor 13 (hand rotation motor) is connected to the hand shaft 15 via pulleys 21, 21 and a belt 22.

Thus, when the first motor 11 is driven, the output shaft of the first motor 11 is rotated, whereby the turning shaft 14 is rotated. Furthermore, when the second motor 12 is driven, the output shaft of the second motor 12 is rotated, whereby the lower arm shaft 16 is rotated. Moreover, when the third motor 13 is driven, the output shaft of the third motor 13 is rotated, whereby the hand shaft 15 is rotated. What's more, when the lifting motor 4 is driven, the case 3 is lifted or lowered as described above, whereby the first to third motors 11 to 13, the turning shaft 14, the hand shaft 15 and the lower arm shaft 16 accommodated in the case 3 are also lifted or lowered. The transfer apparatus 1 is equipped with a control section 70, and the control section 70 controls the drive of the first to third motors 11 to 13 and the lifting motor 4.

The lower arm 23 (first arm) is disposed on the upper side of the housing 2. The lower arm 23 has a rectangular parallelepiped shape extending in the horizontal direction. A lower through hole 23a is provided in the lower face section at one end section of the lower arm 23, and the peripheral edge section of the lower through hole 23a is coaxially connected to the peripheral edge section of the lower arm shaft 16. The lower arm 23 is rotated by the rotation of the lower arm shaft 16.

Inside the lower arm 23, on the upper side of the lower through hole 23a, a bearing 26 is supported so that the axial direction thereof is aligned with the vertical direction. The outer ring of the bearing 26 is connected to the upper face section of the lower arm 23 via a connection section. The upper end section of the turning shaft 14 is inserted into the lower through hole 23a and is fitted in the inner ring of the bearing 26. A pulley 14a is coaxially connected to the lower side of the inner ring of the bearing 26. The inner ring of the bearing 26 and the pulley 14a are rotated by the rotation of the turning shaft 14.

Inside the lower arm 23, a pulley 24c (third pulley) is fitted on the outside of the intermediate section of the turning shaft 14 via a bearing 24a.

An upper through hole 23c is provided in the upper face section at the other end section of the lower arm 23. A support shaft 23b protrudes upward from the lower face section at the other end section of the lower arm 23 and is inserted into the upper through hole 23c. A pulley 24d (fourth pulley) is fitted on the outside of the lower end section of the support shaft 23b via a bearing 24a. The ratio of the diameter of the pulley 24c to the diameter of the pulley 24d is 4:1. A second hand shaft 51 having a cylindrical shape and being rotatable around its axis is coaxially connected to the upper side of the pulley 24d. The support shaft 23b is inserted into the second hand shaft 51. Inside the lower arm 23, a pulley 27 is fitted on the outside of the intermediate section of the second hand shaft 51 via a bearing 27a. The ratio of the diameter of the pulley 14a to the diameter of the pulley 27 is 2:1.

In other words, since the ratio of the rotation angle of the pulley 24c to the rotation angle of the pulley 24d is 1:4, the ratio of the rotation angle of the hand shaft 15 to the rotation angle of the second hand shaft 51 is 1:4. Furthermore, since the ratio of the rotation angle of the pulley 14a to the rotation angle of the pulley 27 is 1:2, when it is assumed that a cylindrical body 29, described later, is a rotation shaft, the ratio of the rotation angle of the turning shaft 14 to the rotation angle of the cylindrical body 29 is 1:2.

Inside the lower arm 23, the upper end section of the hand shaft 15 is connected to the lower end section of the support shaft 23b via the pulleys 24c and 24d and a belt 25 (third belt).

The upper arm 30 (second arm) is disposed above the lower arm 23. The upper arm 30 has a rectangular parallelepiped shape extending in the horizontal direction. A lower through hole 30a is provided in the lower face section at one end section of the upper arm 30, and a hand hole 30b is provided in the end face section at the other end section of the upper arm 30. The peripheral edge section of the lower through hole 30*a* is connected to the pulley 27 via the cylindrical body 29. The cylindrical body 29 is connected to the turning shaft 14 via the pulleys 14*a* and 27 and a belt 28. The support shaft 23*b* and the second hand shaft 51 are inserted into the cylindrical body 29 and extend to the inside of the upper arm 30. Inside the upper arm 30, the upper end section of the support shaft 23*b* protrudes higher than that of the second hand shaft 51.

Figure 4:
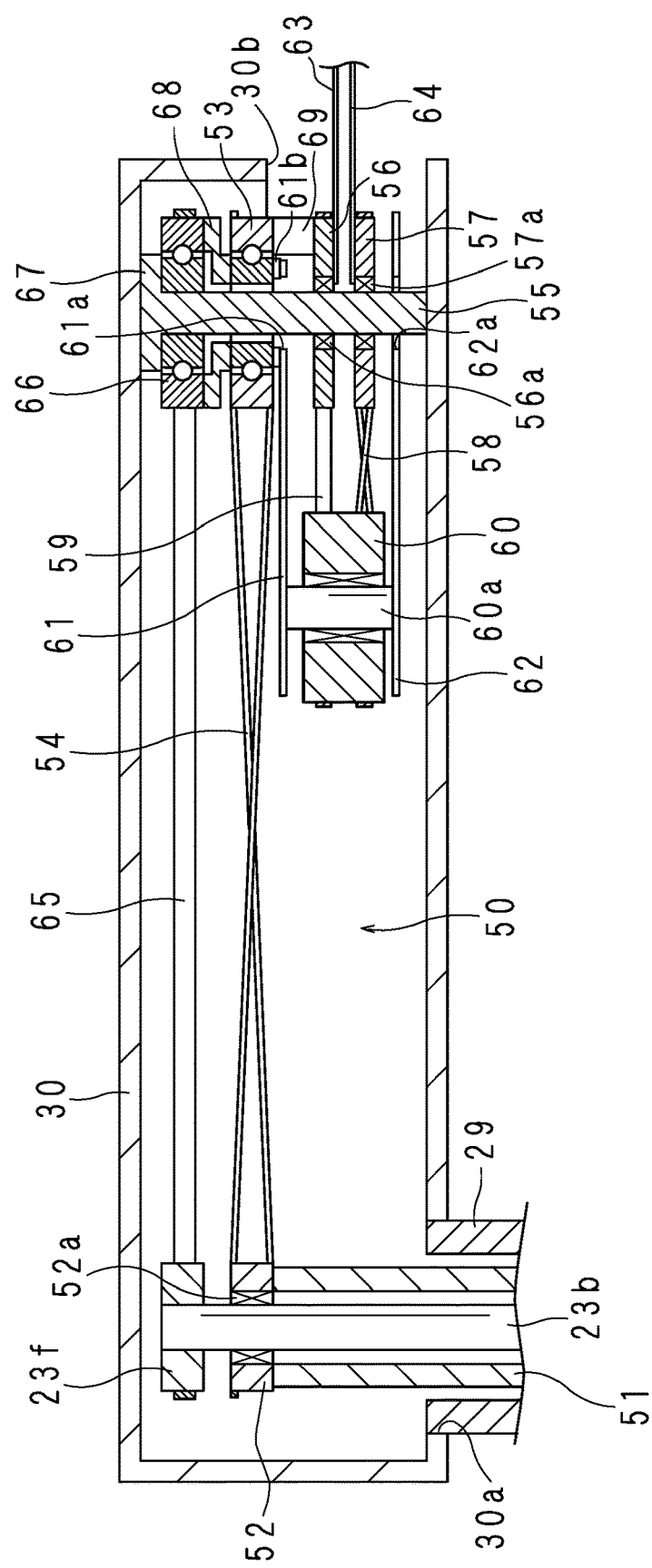
FIG. 4 is a partially enlarged sectional view schematically showing a hand drive mechanism inside the upper arm.
Figure 5:
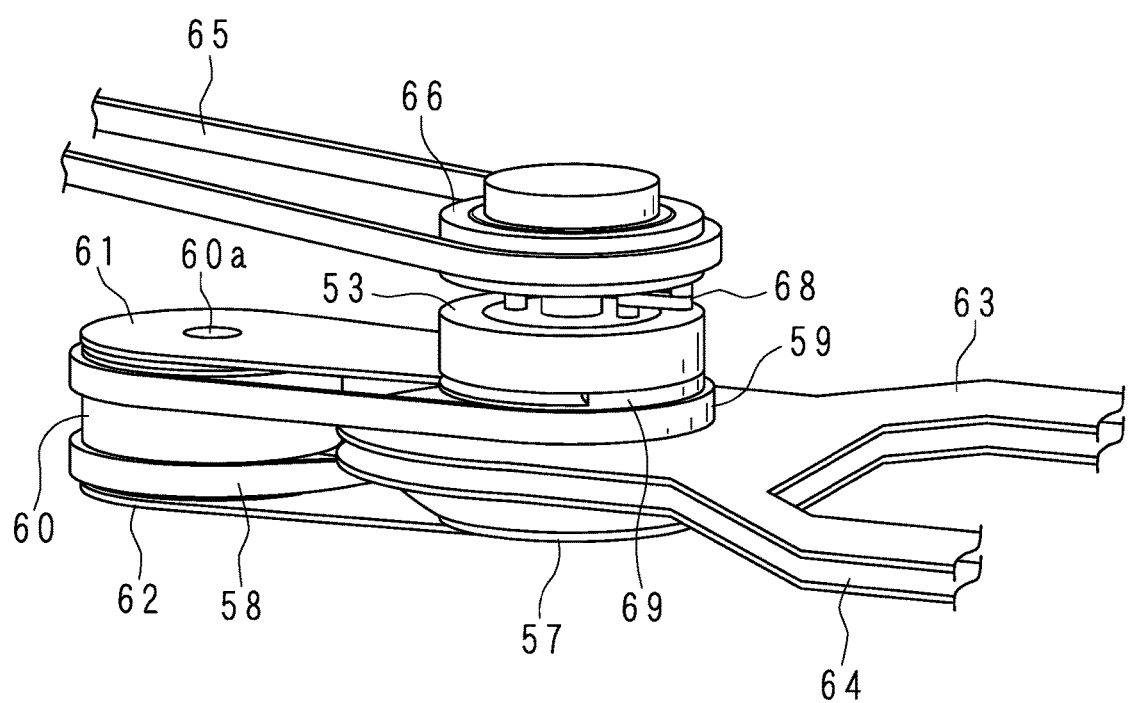
FIG. 5 is a partially enlarged perspective view schematically showing the rotation mechanism for the upper hand and the lower hand.

FIG. 4 is a partially enlarged sectional view schematically showing a hand drive mechanism 50 inside the upper arm 30, and FIG. 5 is a partially enlarged perspective view schematically showing the rotation mechanism for the upper hand 63 and the lower hand 64. In FIG. 5, an 8-shaped belt 54 is not shown. The hand drive mechanism 50 is equipped with a pulley 23*f* fitted on the outside of the upper end section of the support shaft 23*b*. The pulley 23*f* is fixed to the support shaft 23*b*. Below the pulley 23*f*, a pulley 52 (fifth pulley) is fitted on the outside of the intermediate section of the support shaft 23*b*. The pulley 52 is connected to the pulley 24*d* via the second hand shaft 51.

The hand drive mechanism 50 is equipped with a second support shaft 55 provided inside the upper arm 30 at the other end section of the upper arm 30. The axial direction of the second support shaft 55 is aligned with the vertical direction. The upper end section of the second support shaft 55 is connected to the upper face section of the upper arm 30 via a connection plate 67. A pulley 66 is fitted on the outside of the upper end section of the second support shaft 55. The pulley 66 has an inner ring and an outer ring. The second support shaft 55 is fitted in the inner ring of the pulley 66. The pulley 23*f* is connected to the outer ring of the pulley 66 via a belt 65. The ratio of the diameter of the pulley 23*f* to the diameter of the outer ring of the pulley 66 is 1:2.

In other words, since the ratio of the rotation angle of the pulley 23*f* to the rotation angle of the outer ring of the pulley 66 is 2:1, when it is assumed that a connecting body 68, described later, is a rotation shaft, the ratio of the rotation angle of the support shaft 23*b* to the rotation angle of the connecting body 68 (the rotation angle of the inner ring of a pulley 53, described later) is 2:1.

On the lower side of the pulley 66 inside the upper arm 30, the pulley 53 (sixth pulley) is fitted on the intermediate section of the second support shaft 55. The pulley 53 has an inner ring and an outer ring. The ratio of the diameter of the pulley 52 to the diameter of the outer ring of the pulley 53 is 1:2. The inner ring of the pulley 53 is fitted and fixed to the second support shaft 55. An 8-shaped belt 54 (fourth belt) is stretched around the pulley 52 and the outer ring of the pulley 53. The rotation of the pulley 52 is transmitted to the outer ring of the pulley 53 via the 8-shaped belt 54. The outer ring of the pulley 53 is rotated in the direction opposite to the rotation direction of the pulley 52. The outer ring of the pulley 66 is connected to the inner ring of the pulley 53 via the connecting body 68.

In other words, since the ratio of the rotation angle of the pulley 52 to the rotation angle of the outer ring of the pulley 53 is 2:1 and the pulley 52 and the outer ring are rotated in opposite directions, when it is assumed that a connecting member 69, described later, is a rotation shaft, the ratio of the rotation angle of the second hand shaft 51 to the rotation angle of the connecting member 69 is 2:1, and the second hand shaft 51 and the connecting member 69 are rotated in opposite directions.

Below the pulley 53, an upper hand pulley 56 (first pulley) is fitted on the second support shaft 55 via a bearing 56*a*, and below the upper hand pulley 56, a lower hand pulley 57 (second pulley) is fitted on the second support shaft 55 via a bearing 57*a*. The upper hand pulley 56 is connected to the outer ring of the pulley 53 via the connecting member 69 having a fan shape in a plan view. The connecting member 69 is provided along the circumferential directions of the upper hand pulley 56 and the pulley 53.

An intermediate pulley 60, the axial direction of which is aligned with the vertical direction, is disposed below the 8-shaped belt 54. The vertical width of the intermediate pulley 60 is larger than the total of the vertical widths of the upper hand pulley 56 and the lower hand pulley 57.

The intermediate pulley 60 has a shaft 60*a*, and the upper end section and the lower end section of the shaft 60*a* protrude outward from the intermediate pulley 60 in the axial direction. A connecting ring 61*b* is coaxially fixed to the lower face of the inner ring of the pulley 53. An upper plate 61 is connected to the upper end face of the shaft 60*a*. The upper plate 61 extends toward the second support shaft 55. A through hole 61*a* being coaxial with the hole in the connecting ring 61*b* is formed in the extending end section of the upper plate 61. The extending end section of the upper plate 61 is connected to the lower face of the connecting ring 61*b*. The second support shaft 55 is rotatably inserted into the through hole 61*a* and the connecting ring 61*b*. A lower plate 62 is connected to the lower end face of the shaft 60*a*. The lower plate 62 extends toward the second support shaft 55. A through hole 62*a* is formed in the extending end section of the lower plate 62, and the second support shaft 55 is rotatably inserted into the through hole 62*a*. The ratio of the diameter of the upper hand pulley 56 to the diameter of the intermediate pulley 60 is 1:1. Furthermore, the ratio of the diameter of the lower hand pulley 57 to the diameter of the intermediate pulley 60 is 1:1.

As shown in FIGS. 4 and 5, a belt 59 (first belt) is stretched around the upper hand pulley 56 and the upper portion of the intermediate pulley 60. An 8-shaped belt 58 (second belt) is stretched around the lower hand pulley 57 and the lower portion of the intermediate pulley 60. The upper hand 63 (first hand) is provided on the upper hand pulley 56 and protrudes from the hand hole 30*b*. The lower hand 64 (second hand) is provided on the lower hand pulley 57 and protrudes from the hand hole 30*b*.

By the rotation of the third motor 13, the hand shaft 15 is rotated, the rotation of the hand shaft 15 is transmitted to the second hand shaft 51, the second hand shaft 51 is rotated around its axis, and the outer ring of the pulley 53 is rotated. Since the pulley 53 is connected to the upper hand pulley 56 via the connecting member 69, the upper hand pulley 56 is rotated and the upper hand 63 is rotated. By the rotation of the upper hand pulley 56, the intermediate pulley 60 is rotated, and by the rotation of the intermediate pulley 60, the lower hand pulley 57 is rotated.

Since the 8-shaped belt 58 is stretched around the intermediate pulley 60 and the lower hand pulley 57, the lower hand pulley 57 is rotated in the direction opposite to the rotation direction of the upper hand pulley 56. Hence, the upper hand 63 and the lower hand 64 are rotated in opposite directions, thereby rotated in mutually approaching or separating directions. The control section 70 rotates the upper hand 63 and the lower hand 64 in the range where the connecting member 69 does not interfere with the upper plate 61.

Figure 6:
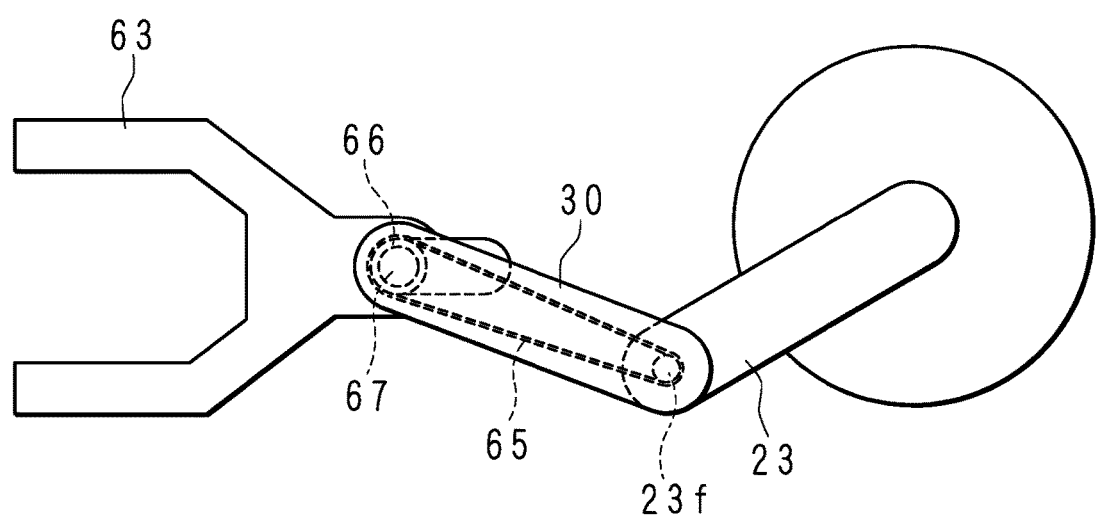
FIG. 6 is a plan view schematically showing the transfer apparatus having moved straight.
Figure 7:
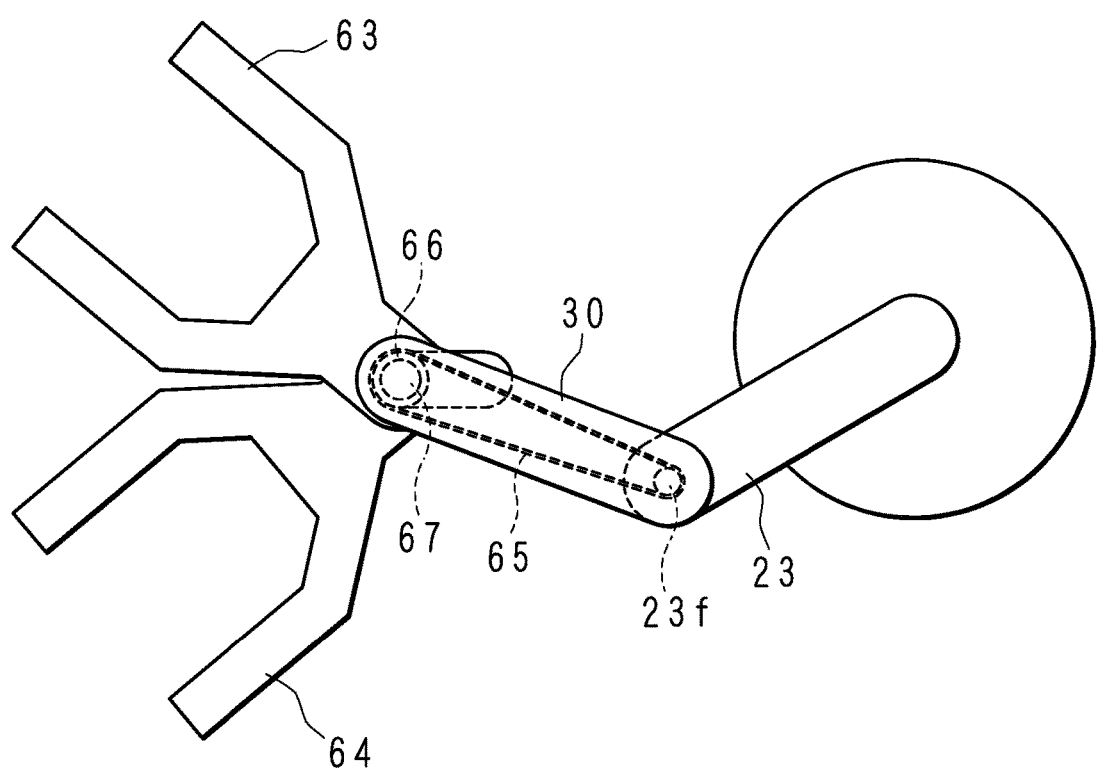
FIG. 7 is a plan view schematically showing the upper hand and the lower hand having been opened after the straight movement.

FIG. 6 is a plan view schematically showing the transfer apparatus having moved straight, and FIG. 7 is a plan view schematically showing the upper hand and the lower hand having been opened after the straight movement. As described above, the ratio of the diameter of the pulley 24c to the diameter of the pulley 24d is set to 4:1, and the ratio of the diameter of the pulley 14a to the diameter of the pulley 27 is set to 2:1. Furthermore, the ratio of the diameter of the pulley 52 to the diameter of the outer ring of the pulley 53 is 1:2, and the ratio of the diameter of the pulley 23f to the diameter of the outer ring of the pulley 66 is 1:2. Moreover, the 8-shaped belt 54 is stretched around the pulley 52 and the outer ring of the pulley 53.

Hence, the upper arm 30 is rotated by an angle twice that of the lower arm 23, and the upper hand 63 and the lower hand 64 are moved straight. As shown in FIG. 6, in the case that the lower arm 23 is rotated, the upper hand 63 and the lower hand 64 are moved straight while the relative angle therebetween is unchanged. For example, in the case that the lower arm 23 is rotated counterclockwise, the upper arm 30 is rotated clockwise, and the upper hand 63 and the lower hand 64 are rotated counterclockwise, whereby the upper hand 63 and the lower hand 64 are moved straight. Although the case in which the rotation speed of each pulley is set depending on the diameter of the pulley is taken as an example in the above description, the rotation speed of each pulley may be set depending on the number of the teeth of the pulley.

As shown in FIG. 7, in the case that, after the straight movement, the hand shaft 15 is rotated by rotating the third motor 13, the upper hand 63 and the lower hand 64 are rotated by the 8-shaped belt 58 in mutually opposite directions and perform an opening/closing operation. As shown in FIGS. 6 and 7, only the opening/closing operation of the upper hand 63 and the lower hand 64 is performed, and the posture of the rotation mechanism for the upper hand 63 and the lower hand 64 held between the upper plate 61 and the lower plate 62 is unchanged regardless of whether the hands are opened or closed.

Next, the transmission mechanisms of the transfer apparatus will be described in detail.

<The Transmission Mechanism for Determining the Rotation Center Position and Directions of the Upper Hand 63 and the Lower Hand 64>

When the lower arm shaft 16 is rotated by driving the second motor 12, the lower arm 23 is rotated (turned) around the axis of the lower arm shaft 16. At this time, if the turning shaft 14 is not rotated, the pulley 14a is relatively rotated in the direction opposite to the rotation direction of the lower arm shaft 16. Since the above-mentioned rotation angle relationship is present at this time, the pulley 27 is rotated by an angle twice that of the pulley 14a. Hence, the cylindrical body 29 assumed to be a rotation shaft is rotated, and the upper arm 30 is rotated (turned) by an angle twice that of the lower arm 23 in the opposite direction. (For example, when the lower arm 23 is rotated 45 degrees, the upper arm 30 is rotated 90 degrees around the axis of the lower arm shaft 16 in the direction opposite to the rotation direction of the lower arm 23.

Furthermore, since the support shaft 23b is fixed to the lower arm 23, when the upper arm 30 is rotated (turned) around the axis of the cylindrical body 29 (the rotation shaft of the upper arm 30) with respect to the lower arm 23, the pulley 23f is relatively rotated in the direction opposite to the rotation direction of the cylindrical body 29. The rotation angle of the pulley 23f at this time is the same as the rotation angle of the upper arm 30 with respect to the lower arm 23. (For example, when the upper arm 30 is rotated 90 degrees with respect to the lower arm 23, the rotation angle of the pulley 23f is 90 degrees and its rotation direction is opposite.)

In addition, since the above-mentioned rotation angle relationship is present, the outer ring of the pulley 66 is rotated by an angle half that of the pulley 23f. In other words, the outer ring of the pulley 66 is rotated by an angle half that of the upper arm 30 in the direction opposite to the rotation direction (turning direction) of the upper arm 30. (For example, when the upper arm 30 is rotated 90 degrees with respect to the lower arm 23, the rotation angle of the outer ring of the pulley 66 is 45 degrees and the rotation direction thereof is opposite.)

Moreover, the outer ring of the pulley 66 rotates the connecting body 68 that is assumed to be a rotation shaft. The connecting body 68 is connected to the intermediate pulley 60 via the inner ring of the pulley 53 and the upper plate 61. The intermediate pulley 60 has a function for determining the directions of the upper hand 63 and the lower hand 64.

Hence, in this embodiment, the rotation center position and directions of the upper hand 63 and the lower hand 64 are determined by the transmission mechanism for transmitting the power of the second motor 12 and the subsequent motor. (Since the upper hand 63 and the lower hand 64 are also rotated as a matter of course, although their directions are not determined by only the power of the second motor 12, the direction being used as the reference direction is determined.) The rotation center position of the upper hand 63 and the lower hand 64 is the same as the position of the axis center of the upper hand pulley 56.

Accordingly, when the lower arm shaft 16 is rotated in the state in which the turning shaft 14 is not rotated, the lower arm 23 is rotated around the axis of the lower arm shaft 16, and the upper arm 30 is rotated around the axis of the cylindrical body 29 by an angle twice that of the lower arm 23 in the opposite direction. Furthermore, the intermediate pulley 60 is rotated around the axis of the connecting body 68 by an angle half that of the upper arm 30 in the opposite direction.

The turning shaft 14, the hand shaft 15 and the lower arm shaft 16 are disposed coaxially, the support shaft 23b, the second hand shaft 51 and the cylindrical body 29 are disposed coaxially, and the second support shaft 55, the pulley 66, the pulley 53, the upper hand pulley 56 and the lower hand pulley 57 are disposed coaxially.

Furthermore, since the distance between the turning shaft 14 and the support shaft 23b is equal to the distance between the support shaft 23b and the second support shaft 55, even when the lower arm 23 is rotated, the intermediate pulley 60 is moved straight without changing its direction.

Since the direction from the shaft 60a of the intermediate pulley 60 to the second support shaft 55 is used as the reference direction of the upper hand 63 and the lower hand 64, it is important to make the direction of the intermediate pulley 60 constant. Moreover, in this embodiment, the angles of the upper hand 63 and the lower hand 64 can be changed with respect to the reference direction.

<The Transmission Mechanism Relating to the Opening and Closing of the Hands>

When the lower arm 23 is rotated (turned) by rotating the lower arm shaft 16 using the second motor 12, in the case that the turning shaft 14 and the hand shaft 15 are not rotated, the pulley 24c is relatively rotated in the direction opposite to the rotation direction of the lower arm shaft 16. Since the above-mentioned rotation angle relationship is present at this time, the pulley 24d is rotated by an angle four times that of the pulley 24c. Since the rotation angle of the pulley 24c is equal to the rotation angle of the pulley 14a, the second hand shaft 51 connected to the pulley 24d is rotated by an angle twice that of the cylindrical body 29. Hence, the second hand shaft 51 is rotated although the hand shaft 15 is not rotated.

When the second hand shaft 51 is rotated, the pulley 52 is rotated. The rotation angle of the pulley 52 is four times that of the pulley 24c disposed inside the lower arm 23. However, since the pulley 52 is disposed inside the upper arm 30, the rotation angle offset by the rotation angle of the upper arm 30 becomes the substantial rotation angle of the pulley 52.

That is to say, the rotation angle twice the rotation angle of the pulley 24c becomes the substantial rotation angle of the pulley 52. Since the rotation angle of the pulley 24c is equal to the rotation angle of the pulley 14a as described above, the rotation angle of the pulley 23f becomes equal to the rotation angle of the pulley 52.

What's more, since the 8-shaped belt 54 is stretched around the pulley 52 and the outer ring of the pulley 53, the outer ring of the pulley 53 and the connecting member 69 are rotated by a rotation angle half that of the pulley 52 in the opposite direction. By the rotation of the connecting member 69, the upper hand 63 is rotated in the same direction as that of the connecting member 69. Furthermore, the lower hand 64 is rotated in the direction opposite to the rotation direction of the connecting member 69. In other words, the upper hand 63 and the lower hand 64 are opened and closed in mutually opposite directions.

As described above, when the lower arm 23 is rotated (turned) by rotating the lower arm shaft 16, in the case that the turning shaft 14 and the hand shaft 15 are not rotated, the angle of "the straight line extending from the shaft 60a of the intermediate pulley 60 to the second support shaft 55" with respect to "the straight line indicated by the longitudinal direction of the upper arm 30 (the straight line extending from the support shaft 23b to the second support shaft 55)" is changed by the angle of the lower arm shaft 16. Simply speaking, the direction of the intermediate pulley 60 with respect to the longitudinal direction of the upper arm 30 is changed by the rotation angle of the lower arm shaft 16.

As a result, since the upper hand pulley 56 and the lower hand pulley 57 are rotated depending on the change in the angle of the intermediate pulley 60, the upper hand 63 and the lower hand 64 will perform the opening/closing operation. However, even in this case, it is possible to prevent the upper hand 63 and the lower hand 64 from performing the opening/closing operation by rotating the hand shaft 15 while controlling the third motor 13 so as to offset the rotations of the upper hand pulley 56 and the lower hand pulley 57. This can be achieved by simple control because only the third motor 13 is required to be controlled at this time.

However, the control is made simpler if the above-mentioned opening/closing operation can be prevented without driving the third motor 13. In other words, the control is made simpler if the third motor 13 can be driven only when the opening/closing operation of the upper hand 63 and the lower hand 64 is performed. The above-mentioned mechanism is used for that purpose.

The turning shaft 14, the hand shaft 15 and the lower arm shaft 16 are merely required to be rotated simultaneously by the same angle in the same direction in order to turn the whole including the lower arm 23, the upper arm 30, the upper hand 63 and the lower hand 64. Furthermore, the opening/closing operations of the upper hand 63 and the lower hand 64 can be performed by rotating the hand shaft 15. Moreover, in the case that the heights of the upper hand 63 and the lower hand 64 are desired to be changed, the case 3 may merely be lifted or lowered by driving the lifting motor 4.

Figure 8:
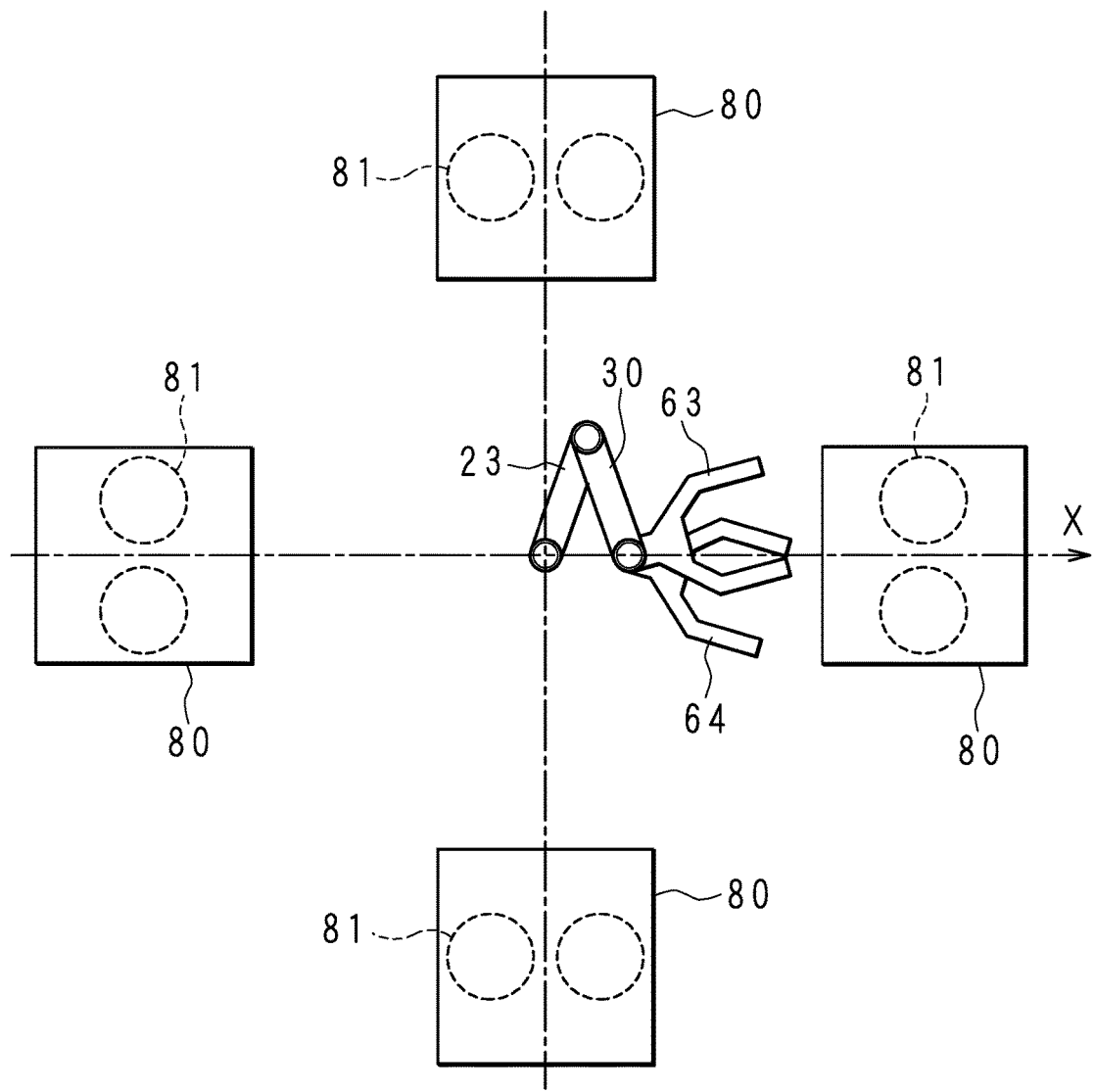
FIG. 8 is a view schematically showing the transfer apparatus and a vacuum chamber.

FIG. 8 is a view schematically showing the transfer apparatus and a vacuum chamber 80. The vacuum chamber 80 is provided with one or more substrates 81. A semiconductor wafer, a liquid crystal substrate, etc. are taken as examples of the substrate 81. For example, the control section 70 makes the upper hand 63 and the lower hand 64 move straight until they enter the vacuum chamber 80. After making the upper hand 63 and the lower hand 64 enter the vacuum chamber 80, the control section 70 drives the third motor 13 to rotate and open the upper hand 63 and the lower hand 64, and the control section 70 makes the upper hand 63 and the lower hand 64 respectively hold two substrates 81. After that, the control section 70 closes the upper hand 63 and the lower hand 64, and the control section 70 makes them withdraw straight from the vacuum chamber 80.

In the case that the gate of the vacuum chamber 80 in which the substrates are processed is narrow, the upper hand 63 and the lower hand 64 can pass through the gate by maintaining the upper hand 63 and the lower hand 64 in an overlapped state (in the closed state) and by advancing the upper arm 30 and the lower arm 23 in the X-direction. After passing through the gate, the upper hand 63 and the lower hand 64 are separated (opened) from each other, thereby being capable of holding the two substrates 81 inside the vacuum chamber 80. After that, the upper hand 63 and the lower hand 64 are overlapped and withdrawn, thereby being capable of transferring the substrates 81 from the vacuum chamber 80.

The control section 70 may control the transfer apparatus so as to open/close the upper hand 63 and the lower hand 64 while moving the upper arm 30 and the lower arm 23 in the horizontal direction.

In the case of turning the transfer apparatus, the control section 70 rotates the first motor 11, the second motor 12 and the third motor 13. The turning shaft 14, the hand shaft 15 and the lower arm shaft 16 are rotated, and the upper arm 30 and the lower arm 23 are turned. The transfer apparatus can load or unload the substrates 81 into or from the desired vacuum chamber 80 by the turning.

In the above-mentioned transfer apparatus 1, the two hands can be driven using a single motor by using the belt-link mechanism, whereby the number of the motors can be reduced and the transfer apparatus can be suppressed from becoming increased in size and complicated in control. Hands for performing only straight moving operation may be provided additionally.

Figure 9:
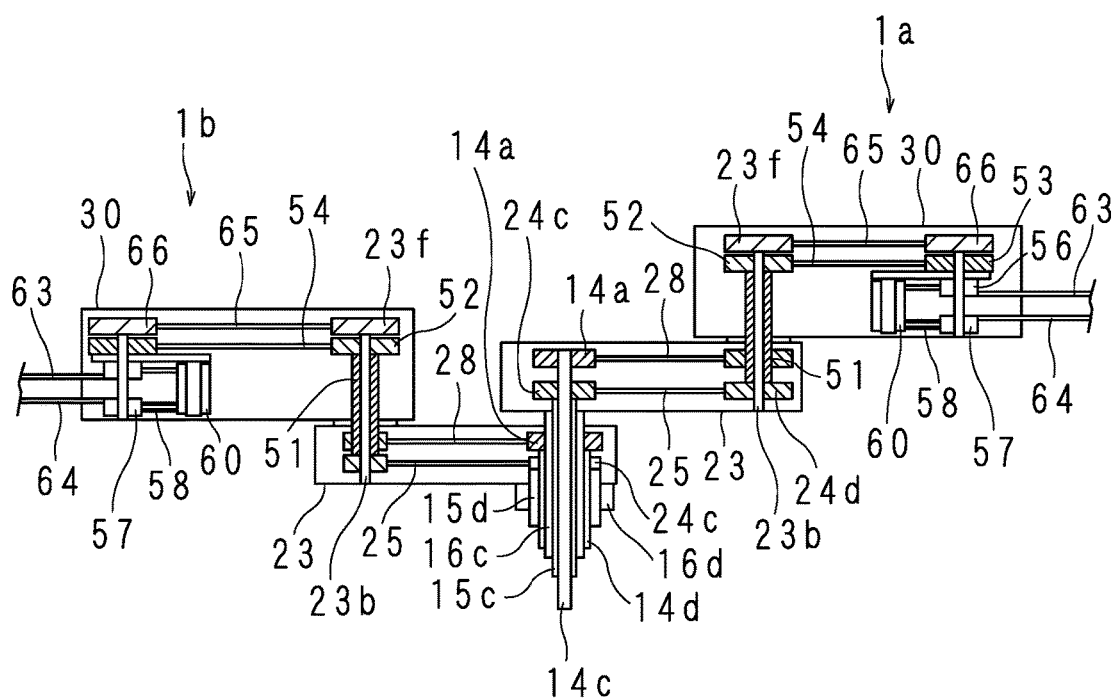
FIG. 9 is a sectional view schematically showing an apparatus in which the two transfer apparatuses are combined.

FIG. 9 is a sectional view schematically showing an apparatus in which the two transfer apparatuses 1 are combined. In FIG. 9, bearings and some other components are not shown to simplify the figure. The two transfer apparatuses 1 are also referred to as a first transfer apparatus 1a and a second transfer apparatus 1b in the following description. The first transfer apparatus 1a and the second transfer apparatus 1b may be combined as shown in FIG. 9. The first transfer apparatus 1a is equipped with a turning shaft 14c, a cylindrical hand shaft 15c into which the turning shaft 14c is inserted, and a cylindrical lower arm shaft 16c into which the hand shaft 15c is inserted.

The second transfer apparatus 1b is equipped with a cylindrical turning shaft 14d into which the lower arm shaft 16c is inserted, a cylindrical hand shaft 15d into which the turning shaft 14d is inserted and a lower arm shaft 16d into which the hand shaft 15d is inserted. In the case that two conventional scalar-type transfer apparatuses are combined, eight motors are required. However, in the case that the two transfer apparatuses 1 according to this embodiment are used, only six motors are required. Furthermore, in the case that the turning shaft 14c of the first transfer apparatus 1a and the turning shaft 14d of the second transfer apparatus 1b are driven by a common motor via pulleys, the number of the motors is further reduced and only five motors are required, whereby the apparatus can be suppressed from becoming increased in size.

Embodiment 2

Figure 10:
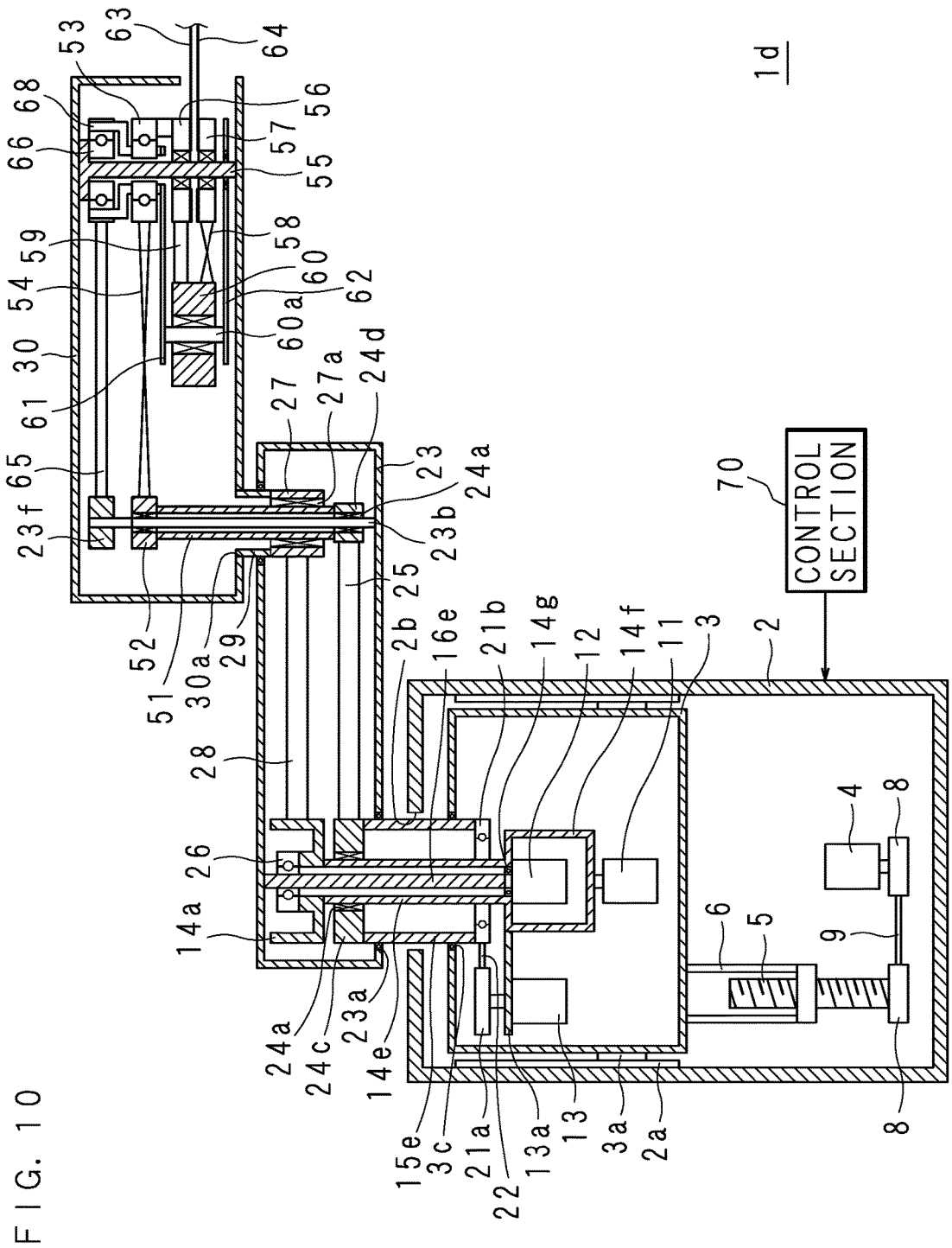
FIG. 10 is a schematic vertical sectional view showing a transfer apparatus according to Embodiment 2.

FIG. 10 is a schematic vertical sectional view showing a transfer apparatus 1d according to Embodiment 2. The components of the transfer apparatus 1d similar to those of the transfer apparatus 1 according to Embodiment 1 are designated by the same reference numerals and signs and their detailed descriptions are omitted. As shown in FIG. 10, a through hole 3c is formed in the upper face section of the case 3 so as to be coaxial with the lower through hole 23a and the through hole 2b. A cylindrical hand shaft 15e being rotatable around its axis is inserted into the through hole 2b and the through hole 3c. Bearings are respectively provided between the hand shaft 15e and the inner circumferential face of the through hole 3c and between the hand shaft 15e and the lower through hole 23a. Moreover, a clearance is provided between the hand shaft 15e and the inner circumferential face of the through hole 2b. The upper end section of the hand shaft 15e is disposed inside the lower arm 23 and connected to the pulley 24c. The lower end section of the hand shaft 15e is disposed inside the case 3. A bearing 21b being coaxial with the hand shaft 15e is disposed on the lower side of the hand shaft 15e. The lower end section of the hand shaft 15e is connected to the outer ring of the bearing 21b.

The transfer apparatus 1d is equipped with a cylindrical turning shaft 14e. The turning shaft 14e is inserted into the cylindrical hand shaft 15e and is fitted in the inner ring of the bearing 21b. The upper end section of the turning shaft 14e is connected to the pulley 14a. A storage chamber 14f is provided at the lower end section of the turning shaft 14e. The storage chamber 14f is disposed below the bearing 21b. The internal space of the storage chamber 14f communicates with the internal space of the turning shaft 14e. The first motor 11 is provided on the storage chamber 14f. The rotation shaft of the first motor 11 is disposed so as to be coaxial with the turning shaft 14e and is connected to the storage chamber 14f. The turning shaft 14e is rotated around its axis by the rotation of the first motor 11.

The second motor 12 is accommodated in the storage chamber 14f. The second motor 12 is fixed to the storage chamber 14f. The rotation shaft of the second motor 12 is supported by the inner circumferential face of the lower end of the turning shaft 14e via a bearing 14g. A lower arm shaft 16e is inserted into the turning shaft 14e. The rotation shaft of the second motor 12 is coaxially connected to the lower end section of the lower arm shaft 16e. The upper end section of the lower arm shaft 16e is connected to the upper face section of the lower arm 23. The lower arm 23 is rotated by the rotation of the second motor 12. The upper end section of the lower arm shaft 16e is fitted in the inner ring of the bearing 26, and the bearing 26 is supported by the lower arm shaft 16e.

A support plate 13a extends sideways from the upper face of the storage chamber 14f. The third motor 13 is supported on the lower face of the support plate 13a. The rotation shaft of the third motor 13 passes through the support plate 13a and is coaxially connected to a pulley 21a on the upper side of the support plate 13a. A belt 22 is stretched around the pulley 21a and the outer ring of the bearing 21b. In the embodiment described above, the first motor 11, the second motor 12 and the third motor 13 are connected via the storage chamber 14f and the support plate 13a. Hence, the turning shaft 14e, the hand shaft 15e and the lower arm shaft 16e are rotated and the upper arm 30 and the lower arm 23 are turned by rotating only the first motor 11. Furthermore, in the case that the heights of the upper hand 63 and the lower hand 64 are desired to be changed, the case 3 may merely be lifted or lowered by driving the lifting motor 4. The other operations are similar to those in Embodiment 1 and their descriptions are omitted.

The transfer apparatuses according to the above-mentioned respective embodiments can be used under both vacuum environment and atmospheric environment. In the case that the transfer apparatuses are used under vacuum environment, vacuum seals, bellows, etc. are used for the turning shafts 14, 14e, the hand shafts 15, 15e, the lower arm shafts 16, 16e, etc. More specifically, vacuum seals, bellows, etc. are used at the positions described below.

In the case of the configuration shown in FIG. 3, vacuum seals are used between the turning shaft 14 and the hand shaft 15, between the hand shaft 15 and the lower arm shaft 16, and between the lower arm shaft 16 and the protruding section 3b. A bellows is used between the inside of the housing 2 in the vicinity of the protruding section 3b and the outside of the case 3.

In the case of the configuration shown in FIG. 10, vacuum seals are used between the lower arm shaft 16e and the turning shaft 14e, between the turning shaft 14e and the pulley 24c, and between the hand shaft 15e and the case 3. A bellows is used between the inside of the housing 2 in the vicinity of the hand shaft 15e and the outside of the case 3.

Furthermore, in the transfer apparatuses according to the above-mentioned respective embodiments, as in the configurations shown in FIGS. 4, 9 and 10, the rotation of the outer ring of the pulley 53 is transmitted in the order of the connecting member 69, the upper hand pulley 56 and the upper hand 63. Hence, the upper hand 63 is rotated and opened/closed around the rotation center position. However, it may be possible that the upper hand 63 is directly connected to the connecting member 69 or the pulley 53 and opened/closed. In other words, it may be possible to have a configuration in which the rotation of the outer ring of the pulley 53 is transmitted in the order of the connecting member 69, the upper hand 63 and the upper hand pulley 56 or in the order of the upper hand 63, the connecting member 69 and the upper hand pulley 56 by connecting the upper hand pulley 56 to the lower side of the upper hand 63. Also with this configuration, the upper hand 63 and the lower hand 64 are opened and closed similarly. However, since the upper hand pulley 56 or the connecting member 69 and the upper hand pulley 56 are disposed between the upper hand 63 and the lower hand 64, in the case that the distance between the upper hand 63 and the lower hand 64 is desired to be made shorter, it is preferable that the rotation of the outer ring of the pulley 53 should be transmitted in the order of the connecting member 69, the upper hand pulley 56 and the upper hand 63 as in the configurations shown in FIGS. 4, 9 and 10.

It is to be noted that, as used herein and in the appended claims, the singular forms "a", "an", and "the" include plural referents unless the context clearly dictates otherwise.

It should be understood that the embodiments disclosed herein are illustrative and non-restrictive in every respect.

The technical features described in the examples may be combined with one another, while all changes that fall within metes and bounds of the claims, or equivalence of such metes and bounds thereof are intended to be embraced by the scope of the present invention.

What is claimed is:

1. A transfer apparatus comprising:
   a first arm,
   a second arm rotatably connected to the first arm,
   a plurality of hands rotatably connected to the second arm in order to hold objects,
   a hand position transmission mechanism serving as a transmission mechanism for determining a rotation center position of the plurality of hands,
   a hand rotation transmission mechanism serving as a transmission mechanism for rotating the plurality of hands around rotation axes of the respective hands in different directions,
   a single hand position motor serving as a motor for providing power for the hand position transmission mechanism, and
   a single hand rotation motor serving as a sole motor for providing power for the hand rotation transmission mechanism.

2. The transfer apparatus according to claim 1, wherein the plurality of hands has a first hand and a second hand that are arranged in an axial direction of a predetermined axis and rotatable around the predetermined axis, and
   the hand rotation transmission mechanism has:
   a first pulley rotated by the rotation of the hand rotation motor,
   an intermediate pulley for relaying the rotation of the first pulley, and
   a second pulley for transmitting rotation to the second hand, wherein
   a direction of the rotation transmitted to the second hand is opposite to that of the intermediate pulley, and
   the intermediate pulley rotates and the first hand rotate in a same direction.

3. The transfer apparatus according to claim 2, wherein the hand position transmission mechanism comprises:
   a third pulley disposed in the first arm and rotated by the rotation of the hand rotation motor and a fourth pulley connected to the third pulley via a belt, wherein the third pulley and fourth pulley rotate in a same direction, and
   a fifth pulley disposed in the second arm and coaxially connected to the fourth pulley via a rotation shaft and a sixth pulley connected to the fifth pulley via a belt and rotated in a direction opposite to the rotation direction of the fifth pulley, wherein
   the sixth pulley is connected to the first pulley,
   a ratio of the diameter or a number of the teeth of the third pulley to that of the fourth pulley is 4:1, and
   a ratio of the diameter or a number of the teeth of the fifth pulley to that of the sixth pulley is 1:2.

* * * * *